United States Patent [19]

Fujino et al.

[11] Patent Number: 4,596,453
[45] Date of Patent: Jun. 24, 1986

[54] ELECTROMAGNETIC DRIVE DEVICE FOR SHUTTER

[75] Inventors: Masahisa Fujino, Tokyo; Ryuji Suzuki, Kanagawa; Mamoru Shimazaki, Tokyo; Yasuo Suda, Kanagawa, all of Japan

[73] Assignee: Canon Kabushiki Kaisha, Tokyo, Japan

[21] Appl. No.: 777,859

[22] Filed: Sep. 18, 1985

Related U.S. Application Data

[63] Continuation of Ser. No. 659,725, Oct. 11, 1984, abandoned.

[30] Foreign Application Priority Data

Oct. 14, 1983 [JP] Japan .......................... 58-159762[U]

[51] Int. Cl.⁴ ............................................. G03B 9/08
[52] U.S. Cl. .................................................. 354/234.1
[58] Field of Search ........... 354/234.1, 235.1, 245-249

[56] References Cited

U.S. PATENT DOCUMENTS 3,638,550  2/1972  Hereford ........................... 354/234.1
4,338,013  7/1982  Shimada et al. ................. 354/234.1
4,353,632  10/1982  Saito et al. ..................... 354/234.1
4,417,797  11/1983  Senuma .......................... 354/234.1

FOREIGN PATENT DOCUMENTS 3100187  12/1981  Fed. Rep. of Germany ... 354/234.1

Primary Examiner—Russell E. Adams
Attorney, Agent, or Firm—Toren, McGeady, Stanger, Goldberg & Kiel

[57] ABSTRACT

An electromagnetic drive device for a focal plane shutter having a tubular yoke and a cylindrical permanent magnet concentrically fixed to the yoke by clamping apparatus. A moving coil in a space between the permanent magnet cylinder and the yoke rotates about the axis of the permanent magnet and is drivingly connected through a shaft to blades of a leading or trailing curtain of the shutter, wherein a pair of holes are formed in one of the end surfaces of the permanent magnet cylinder symmetrical with respect to the axis thereof. The running characteristic of the shutter blades can be adjusted when the distribution of magnetic flux density is previously adjusted by turning the permanent magnet with the use of a tool engaged in the holes.

2 Claims, 7 Drawing Figures

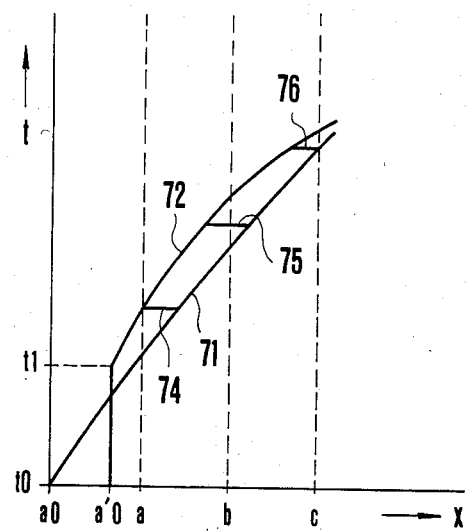
F I G. 1(a)
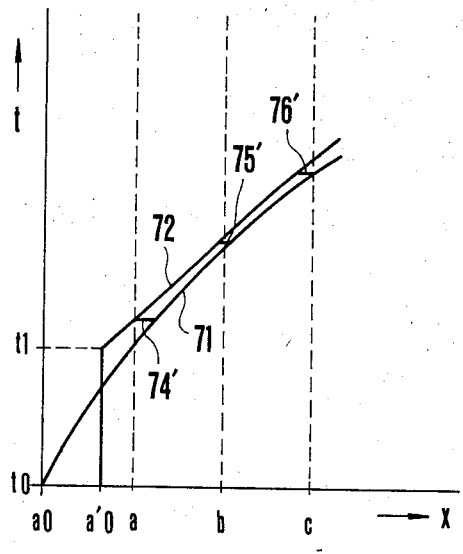
F I G. 1(b)

ELECTROMAGNETIC DRIVE DEVICE FOR SHUTTER

This is a continuation of application Ser. No. 659,725, filed Oct. 11, 1984 abandoned.

BACKGROUND OF THE INVENTION

1. Field of the Invention

This invention relates to improvements of the electromagnetic drive of the focal plane shutter.

2. Description of the Prior Art

As the strength of magnetization in permanent magnets has recently increased, an increasing number of shutters employing electrically operated magnet devices as the drive source have come to be known. Of such electromagnetically driven shutters there is one which comprises a coil or other electrically conducting member in a magnetic field of a stator when current is supplied which rotates in either direction depending on the direction of current flow and which is drivingly connected through its shaft to shutter blades. In this shutter, however, it has been very difficult to establish a desired running speed curve of the shutter blades. In application of such an electromagnetic drive device to slit shutters, which provide for the leading and trailing curtains with respective individual electromagnetic drive sources, another problem which arises is that there is a possibility of an uneven exposure across the picture frame when the leading and trailing curtains unintentionally have different running curves from each other due to size variations from part to part or differences in the intertia and sliding friction between the leading and trailing curtains.

In the conventional or spring powered type slit shutter, such a problem has been solved by adjusting the diameter of the wire, the number of turns, and the convolution diameter of the spring for each of the leading and trailing curtains followed by finely adjusting the drive spring characteristic when the number of revolutions of the drive shaft in charging is changed, so that the aforesaid variations and the differences are absorbed and corrected.

However when the electromagnetic force is used as the drive force, to adjust the weight distribution, friction and other factors of each of the curtains to specific settings is technically a very difficult operation, and moreover, is also not amenable to mass production techniques. For this reason, in the art of conductive rotor type electromagnetically driven shutters, a method for previously adjusting the phase of rotation of the rotor so that the flux density of the magnetic field formed between the rotor and the stator of the permanent magnet varies as a prescribed function of the phase has been proposed in U.S. Pat. No. 4,417,797.

The present invention relates to one aspect of the above-identified method and more particularly to improvements of the method for adjusting the angular position of the permanent magnet. This adjusting method has a problem in that when turning the permanent magnet, it must be grasped at the outer periphery by a tool. Because the outer periphery is of an arcuate shape, the clamping force in the diametrical direction is necessarily far greater than the tangential force necessary to turn the permanent magnet stator against frictional force on the mount. Meanwhile, to increase the rate of the driving power to the current intensity of the battery, it is usual to use rare earth magnet as the substance of the stator. When this permanent magnet stator while being grasped by pliers is being turned to perform the adjusting operation, a crack or a broken piece is often produced, causing imperfections in that part. Also, because the broken piece is attracted to and held on the permanent magnet itself, and since the yoke, stator and rotor are positioned as close to each other as possible to improve the rate of the driving power, the electrically conducting member of the rotor is damaged when the rotor comes into contact with the broken piece as it rotates.

To avoid this, a pair of holes may be formed in the magnet to engage an adjusting tool. For this purpose, if the machining method is employed, special means such as a grinder is necessary. Since the magnet is made of brittle material such as rare earth, the production cost is increased. In the worst case, no machining means can be employed.

Another problem arising in the assembly line of such an electromagnetic drive device is that if the stator after magnetization is brought into assembly, the attraction force working on the yoke and other metal parts will make it very troublesome to perform the assembling operation. To avoid this, there has been a proposal for magnetizing the stator after it has been assembled. By this proposal, however, when assembling, the stator must be accurately oriented with respect to the direction of magnetization. Otherwise, the efficiency of later magnetization would become worse, causing the characteristics of the resultant permanent magnet to be badly deteriorated. And, this direction of magnetization is very difficult to detect because it is not yet magnetized itself. To reduce this difficulty, for example, it must be weakly magnetized before assembling. Then after determination of the direction has been made, de-magnetization is carried out before it is assembled. But, accuracy of direction determination is not very good.

The present invention is to improve conventional drawbacks as described above and to mold a pair of adjusting holes into a permanent magnet in the round flat surface portion thereof in symmetrical relation to the center of the area when the permanent magnet is formed by sintering techniques.

Because this round flat surface does not utilize the flux of the permanent magnet, a sufficiently long gap to the moving coil may be provided so that even when a broken piece remains attached on the permanent magnet, there is little possibility of damaging the moving coil. Another advantage is that since the two adjusting holes are symmetrically positioned to each other with respect to the center of rotation of the permanent magnet, no grasping force is required at the center of rotation of the permanent magnet and no grasping force is required to be applied to the permanent magnet when the adjusting operation is performed. Thus, the percentage of permanent magnets which have been assembled without any cracked broken away portions and other imperfections is reduced.

And, since the adjusting holes can be formed by using a common mold for the permanent magnet stator when sintering, almost no increase in cost will result. Furthermore, the use of the sintering technique in forming the permanent magnet allows for application of a magnetic field to the particles of raw material in the mold to orient the polarity of each particle to a direction in which the permanent magnet is to be magnetized before the sintering is carried out. Therefore, the sintered mold has a shape so that a line passing through the two adjusting holes makes a precise angle with the direction of magnetization. Therefore, if this angle is exactly zero or 90°, it is easy to determine in what direction the permanent magnet be oriented when it is to be magnetized.

SUMMARY OF THE INVENTION

An electromagnetic drive device for a focal plane shutter including a tubular yoke, a sintered permanent magnet of the cylindrical shape fixedly secured within the yoke in concentric relation, clamping means for fixedly securing the permanent magnet to the yoke, and a moving coil rotatable in an air space formed by the permanent magnet and the yoke in concentric relation to the permanent magnet. The moving coil is drivingly connected to shutter blades upon supply of electrical power to turn, causing the shutter blades to run from a prescribed start position to a terminal position for the purpose of making an exposure, whereby the permanent magnet is provided with a pair of holes for adjustment of its angular position formed in a round flat surface portion thereof by using a common mold, and, as it turns, the distribution of magnetic flux density is adjusted to a prescribed setting so as to establish a desired running characteristic of the shutter blades.

BRIEF DESCRIPTION OF THE DRAWINGS

The present invention is described in detail in the following by reference to the drawings in which:

FIGS. 1(a) and (b) are graphs explaining phenomena of uneven exposures as a central over-exposure and a central under-exposure respectively.

DETAILED DESCRIPTION OF THE PREFERRED EMBODIMENT

Figure 2:
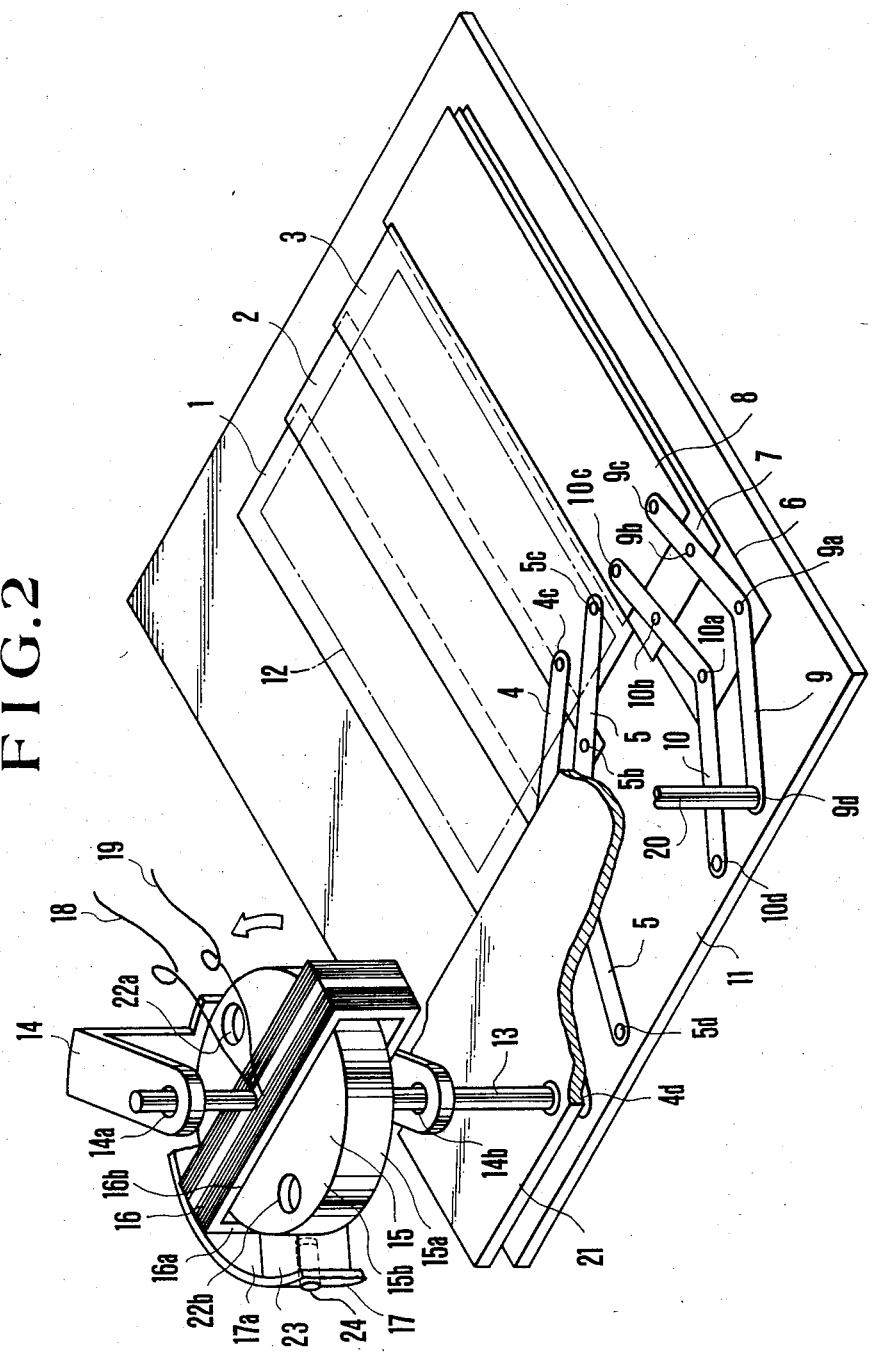
FIG. 2 is a perspective view of an electromagnetically driven shutter to which the present invention is applied.

FIGS. 1(a) and 1(b) illustrate how an exposure is not uniform due to the difference between the driven characteristics of the leading and trailing curtain of the conventional focal plane shutter where the abscissa is in the distance the border of the curtain runs and the ordinate is in time. Along the abscissa there are shown a point, $a_0$, for the start position of the border of the leading curtain, and points, a and c, for the positions of the upper and lower sides of a film exposure window. Also, reference numeral 71 identifies a leading curtain running curve; 72 a trailing curtain running curve; 74 and 74′ widths of the slit at the start of an exposure; 75 and 75′ widths of the slit at the center of the length between the upper and lower sides of the film exposure window; 76 and 76′ widths of the slit at exposure termination.

Also, $t_0$ and $t_1$ identify times at which the leading and trailing curtains start to run respectively; and $a_0$ and $a_0'$ identify respectively points in position from which the leading and trailing curtains start to run.

FIG. 1(a) shows the phenomenon called "central over-exposure". Because of a difference in the characteristic between the running curves 71 and 72 of the leading and trailing curtains, the width of the slit between the borders of the leading and trailing curtains is larger when it moves across the center of the length of the window than when it moves across either of the upper and lower sides of the window. In FIG. 1(b), conversely, the slit width at the center becomes smaller than at the sides.

Such phenomena as shown in FIGS. 1(a) and 1(b) both result in objectionably uneven exposure of a film frame.

FIG. 2 shows an embodiment of the present invention, where a shutter base plate 11 has an exposure window 12. Arms 4 and 5 support blades 1, 2 and 3 of a leading curtain. The arm 4 is fixedly mounted at its one end 4d on a drive shaft 13 for the leading curtain. The drive shaft 13 is rotatably mounted on the shutter base plate 11. One end 5d of the other arm 5 is pivotally mounted on the base plate 11. The blades 1, 2 and 3 are pivotally mounted on the arms 4 and 5 through pins 4a, 4b, 4c, 5a, 5b and 5c. Arms 9 and 10 support blades 6, 7 and 8 of a trailing curtain. One end 9d of the arm 9 is fixedly mounted on a drive shaft 20 for the trailing curtain. The drive shaft 20 is rotatably mounted on the base plate 11. One end 10d of the arm 10 is pivotally mounted on the base plate 11. The blades 6, 7 and 8 are pivotally mounted on the arms 9 and 10 by pins 9a, 9b, 9c, 10a, 10b and 10c. Reference numeral 14 identifies a frame of a meter type electromagnetic drive source. The frame 14 is fixedly mounted to the base plate 11 or a stationary part (not shown) within a camera housing (not shown). A tubular yoke 17 is fixedly mounted to the frame 14. A cylindrical permanent magnet 15 is fixedly secured to the yoke 17 by clamping action of setting screws 24 while maintaining a certain distance from the inner periphery of the yoke 17 through spacers 23 (only one is illustrated). The permanent magnet 15 is diametrically magnetized and forms a magnetic circuit together with the yoke 17. In a round flat surface 15b of the upper end of the permanent magnet cylinder 15 are formed a pair of round recesses 22a and 22b symmetrical with respect to the center of the circle into which a tool for adjusting the angular position is to be inserted, as will be more fully described later.

A moving coil 16 is formed with only a wire in to a bobbinless shape and is fixedly mounted on the shaft 13 which is drivingly connected to the drive arm 4 for the blades 1, 2, 3 of the leading curtain. The coil shaft 13 is rotatably supported in a pair of holes 14a and 14b so that the coil 16 can turn in a space between the permanent magnet 15 and the yoke 17 concentric to the permanent magnet 15.

Lead wires 18 and 19 supply current to the coil 16.

An electromagnetic drive source for the blades 6, 7, 8 of the trailing curtain is constructed in exactly the same way as the above-described electromagnetic drive source for the leading curtain, and, for the purpose of simplified drawing, is shown only with the coil shaft 20, the other parts being omitted.

A cover plate 21 is fixedly mounted in spaced relation to the base plate 11 so that the leading and trailing curtains can freely move therebetween, and has an exposure window similar to that in the base plate 11 and holes through which the coil shafts 13 and 20 extend, though it is partly shown for a better understanding of the drawing.

The operation is as follows: Since the leading and trailing curtain drive systems of FIG. 2 are similar to each other, the following explanation is given using the leading curtain system. When the coil 16 is supplied with electrical power through the lead wires 18 and 19 from a drive circuit, force is exerted in those parts of the coil 16 which lie in the magnetic field. This force works in a direction perpendicular to the directions of the magnetic flux and the current flow, according to Fleming's left-hand rule, and increases with an increase in the number of turns of the coil 16, the intensity of the current, and with decreased distance between the yoke 17 and the permanent magnet 15 in the direction of magnetization, or in the diametrical direction. This force functions on the leading curtain drive shaft 13. The leading blade drive coil 16 receives a rotative force of direction indicated by an arrow (counterclockwise direction), and the leading blade drive shaft 13 also receives a rotative force in the same direction. The leading blade support arm 4 also receives a force to turn in a counterclockwise direction. Therefore, the leading blade support arm 4 receives a driving power, moving in the counterclockwise direction. Through the link mechanism, the leading blades 1, 2 and 3 move to the left as viewed in the drawing, initiating an exposure.

Next, by supplying electrical power to the other electromagnetic drive source for the trailing blades 6, 7, 8, the trailing blades 6, 7, 8 operate in a similar way, running while forming a slit with the leading blades. 1, 2, 3. When the trailing blades 6, 7 and 8 stop in a position where the exposure window 12 is fully covered, the exposure is terminated.

When an uneven exposure is formed in the picture frame, the aforesaid setting screws 24 are loosened, and then the permanent magnet 15 is turned by using a suitable adjusting tool engaging the recesses 22a and 22b of the upper end surface of the permanent magnet cylinder 15 to change the phase of the magnetized position with reference to the initial position of the coil 16. Thus, the running characteristic of the shutter is adjusted.

Figure 3A:
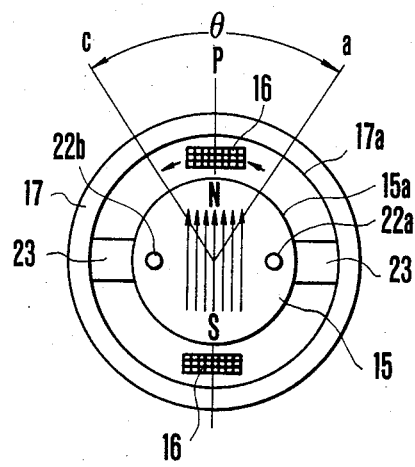
FIGS. 3(a) and 3(b) are respectively a plan view and a characteristic curve illustrating an example of the adjusted angular position of the permanent magnet stator.
Figure 3B:
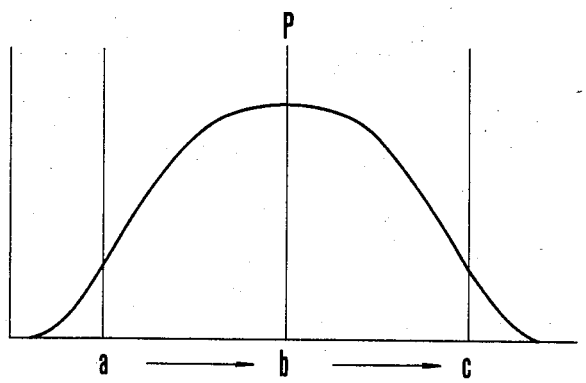

Next, FIG. 3(a) illustrates a relationship between the magnetized position of the permanent magnet 15 and the angular positions of the moving coil 16 at the start and termination of running movement of the shutter, provided that the magnetic flux density of the permanent magnet 15 reaches a maximum at the center of the movement range of the drive coil 16 in the electromagnetically driven shutter, constructed as shown in FIG. 2. FIG. 3(b) illustrates variation in the magnetic flux density or electromagnetic force with the phase of rotation of the drive coil 16. In these figures, the start position from which the shutter runs is indicated at "a", the central position at "b", and the terminal position at "c".

Figure 4A:
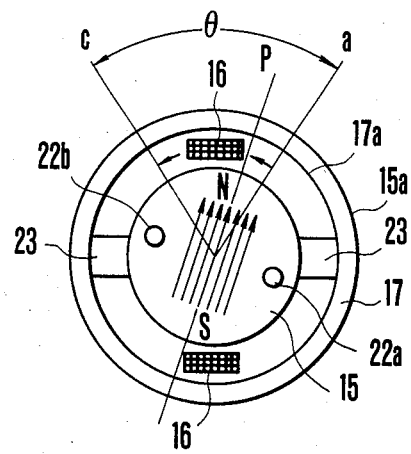
FIGS. 4(a) and 4(b) are similar to FIGS. 3(a) and 3(b) in which another example of the adjusted position is shown.
Figure 4B:
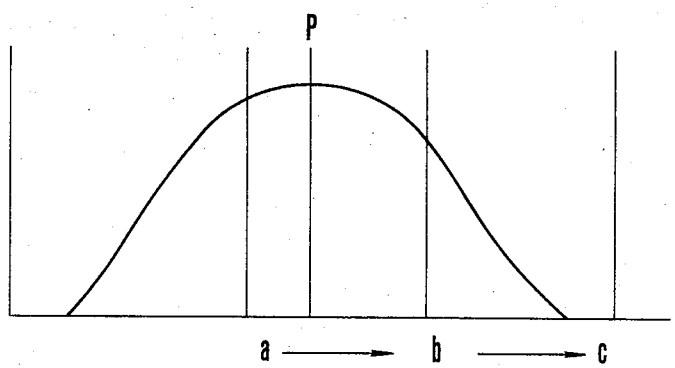

FIGS. 4(a) and 4(b) illustrate another example of adjustment of the angular position of the permanent magnet 15, different from the magnetized position from FIGS. 3(a) and 3(b). As shown in FIG. 4(b), by the adjusting operation, the peak P of the magnetic flux distribution can be brought nearer to the start position in running the shutter. Since the running characteristics of the leading and trailing curtains of the shutter can be adjusted to desired setting by turning the permanent magnet, it is made possible to make an exposure in uniformity over the entire area of the picture frame.

In the present invention, as has been described above, the permanent magnet cylinder is provided with the recessed portions or holes 22a and 22b for facilitating adjustment of the angular position thereof. Therefore, the necessity of grasping the permanent magnet at the outer periphery 15a directly by a pliers with a strong clamping force can be removed. Even when a magnet of brittle material such as rare earth is in use, there is no possibility of producing cracks or other imperfections in the outer periphery thereof. Also it is at the flat surface portion of the permanent magnet that the adjusting holes are located. Even when this portion is broken into pieces, therefore, these pieces are left adhered in the neighborhood of the holes 22a and 22b, being prevented from taking their places on the outer periphery. Since the magnetic flux of this flat surface portion 15b has little influence on the force exerted on the coil 16, the distance to the coil may be taken at a sufficiently large value. Therefore, even if the broken pieces are on the flat surface portion, they will not interfere with the coil 16 as it rotates.

Further, a mold for the holes 22a and 22b may be formed as a unit with that for the permanent magnet cylinder. Therefore, there is almost no increase in cost. These holes 22a and 22b can be made at the same time to serve as a means for improving the efficiency of the assembling operation and as a reference for use in performing accurate orientation of magnetization when the line passing through the holes 22a and 22b is coincident with or perpendicular to the direction of magnetization. This makes it possible to allow for the performance of the permanent magnet to display at maximum.

What is claimed is:

1. An electromagnetic drive device for a focal plane shutter comprising:
   (a) a tubular yoke;
   (b) a permanent magnet of the cylindrical shape fixedly secured within said yoke in concentrical relation;
   (c) clamping means for fixedly securing said permanent magnet to said yoke; and
   (d) a moving coil is arranged rotatable in an air space formed by said permanent magnet and said yoke in concentrical relation to said permanent magnet, said moving coil being drivingly connected to shutter blades upon supply of electrical power to turn, causing the shutter blades to run from a prescribed start position to a terminal position for the purpose of making an exposure, whereby said permanent magnet is provided with a pair of holes for adjustment of its angular position formed in a round flat surface portion thereof by using a common mold, and, as it turns, the distribution of magnetic flux density is adjusted to a prescribed setting so as to establish a desired running characteristic of the shutter blades.

2. A drive device according to claim 1, wherein said pair of holes are positioned in a row to a direction either coincident with or perpendicular to the direction of magnetization of said permanent magnet.

* * * * *